(12) United States Patent
Kimura et al.

(10) Patent No.: US 11,054,634 B2
(45) Date of Patent: Jul. 6, 2021

(54) OPTICAL SCANNING APPARATUS AND METHOD OF CONTROLLING OPTICAL SCANNING APPARATUS

(71) Applicants: Yuji Kimura, Tokyo (JP); Riichiro Hibiya, Tokyo (JP)

(72) Inventors: Yuji Kimura, Tokyo (JP); Riichiro Hibiya, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 117 days.

(21) Appl. No.: 16/671,427

(22) Filed: Nov. 1, 2019

(65) Prior Publication Data

US 2020/0209617 A1 Jul. 2, 2020

(30) Foreign Application Priority Data

Dec. 28, 2018 (JP) .............................. JP2018-247468

(51) Int. Cl.
*G02B 26/08* (2006.01)
(52) U.S. Cl.
CPC .............................. *G02B 26/0858* (2013.01)
(58) Field of Classification Search
None
See application file for complete search history.

(56) References Cited

U.S. PATENT DOCUMENTS

| 2002/0050956 | A1* | 5/2002 | Gerhard | G02B 27/017 345/7 |
|---|---|---|---|---|
| 2006/0082852 | A1* | 4/2006 | Wine | G02B 26/085 359/201.1 |
| 2006/0164330 | A1* | 7/2006 | Bright | G09G 3/001 345/7 |
| 2006/0284790 | A1* | 12/2006 | Tegreene | H04N 1/047 345/7 |
| 2011/0292967 | A1* | 12/2011 | Parmet | G01K 7/25 374/170 |
| 2018/0290881 | A1 | 10/2018 | Yamada et al. | |

FOREIGN PATENT DOCUMENTS

JP 2017-068205 4/2017

* cited by examiner

*Primary Examiner* — Jennifer D. Carruth
(74) *Attorney, Agent, or Firm* — IPUSA, PLLC

(57) ABSTRACT

An optical scanning apparatus that oscillates a mirror in at least one direction, includes a mirror driving circuit including a digital-to-analog converter and an amplifier and generating a pair of driving signals for driving the mirror based on digital driving waveform data, a reference waveform data generator generating a reference waveform data, and an offset setting circuit setting an offset value of the reference waveform data, based on a dead band of the amplifier and a periodic integral non-linearity error of the digital-to-analog converter, to generate the driving waveform data.

14 Claims, 17 Drawing Sheets

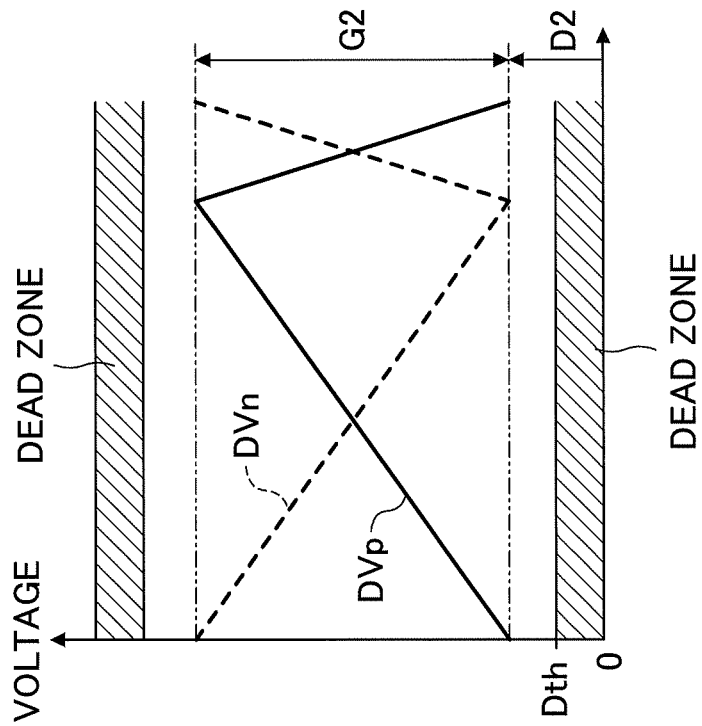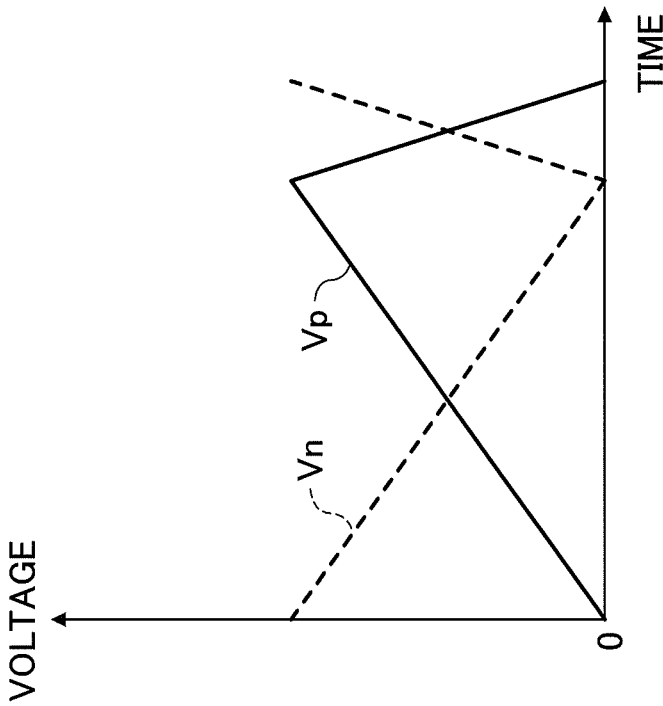
FIG.8A
FIG.8B

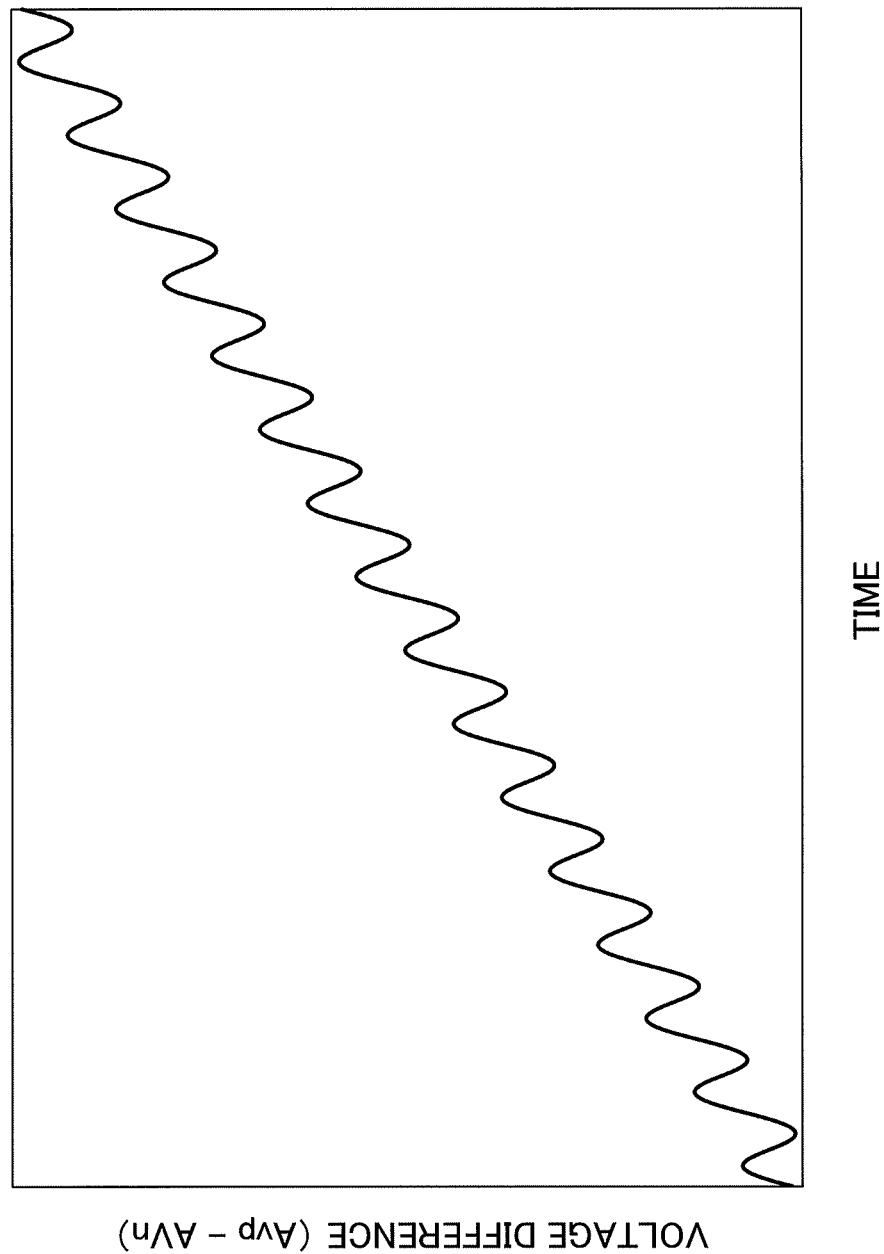

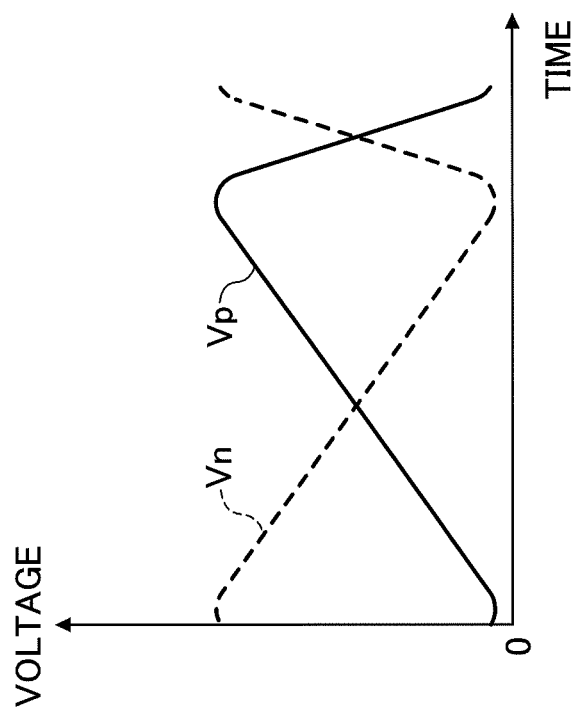
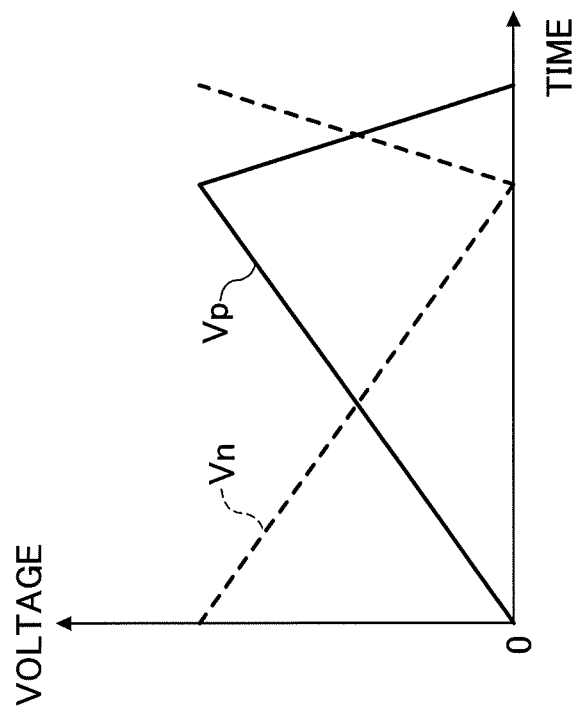

OPTICAL SCANNING APPARATUS AND METHOD OF CONTROLLING OPTICAL SCANNING APPARATUS

CROSS-REFERENCE TO RELATED APPLICATIONS

This application is based on and claims priority to Japanese Patent Application No. 2018-247468 filed on Dec. 28, 2018, the entire contents of which are incorporated herein by reference.

BACKGROUND OF THE INVENTION

1. Field of the Invention

The present invention relates to an optical scanning apparatus, and a method controlling the optical scanning apparatus.

2. Description of the Related Art

A known optical scanning apparatus displays an image by causing a laser beam to scan. The laser beam is caused to scan, by driving and controlling a light source device that emits the laser beam, and an optical scanner that deflects the laser beam. For example, the optical scanner includes a Micro Electro Mechanical System (MEMS) that drives a mirror by a piezoelectric element. The mirror deflects the laser beam by oscillating when a periodic driving voltage, such as a sinusoidal wave or the like, generated by a driving circuit is applied to the piezoelectric element. An example of this optical scanner is described in Japanese Laid-Open Patent Publication No. 2017-068205, for example.

Generally, the driving circuit includes an operational amplifier, and the operational amplifier has a dead zone on both a power supply voltage side and a ground potential side. For this reason, in a case where a part of the driving voltage waveform includes the dead zone, the waveform becomes distorted, and an undesired resonant oscillation may occur. When the waveform of the driving voltage is distorted, a so-called ringing may be generated in the image that is scanned by the optical scanner.

In addition, the driving circuit includes a Digital-to-Analog Converter (DAC) that converts a digital signal supplied from a controller into an analog signal that is input to the operational amplifier. A conversion characteristic of the DAC includes an Integral Non-Linearity (INL) error that is periodic. This INL error also generates the undesired resonant oscillation, and may thus cause the generation of the ringing.

SUMMARY OF THE INVENTION

A technique disclosed herein is devised in view of the above described circumstances, and one object of an aspect of the embodiments is to reduce the generation of the ringing caused by the distortion of the driving voltage waveform.

According to one aspect of embodiments of the present invention, an optical scanning apparatus that oscillates a mirror in at least one direction, includes a mirror driving circuit, including a digital-to-analog converter and an amplifier, configured to generate a pair of driving signals for driving the mirror based on digital driving waveform data; a reference waveform data generator configured to generate a reference waveform data; and an offset setting circuit configured to set an offset value of the reference waveform data, based on a dead band of the amplifier and a periodic integral non-linearity error of the digital-to-analog converter, to generate the driving waveform data.

Other objects and further features of the present invention will be apparent from the following detailed description when read in conjunction with the accompanying drawings.

BRIEF DESCRIPTION OF THE DRAWINGS

FIG. 8A and FIG. 8B are diagrams for explaining the gain process and the offset process with respect to a vertical reference waveform data;

FIG. 10A and FIG. 10B are diagrams respectively illustrating a first vertical driving signal and a second vertical driving signal superimposed with INL errors that have different phases, and a potential difference between the first vertical driving signal and the second vertical driving signal;

FIG. 15A and FIG. 15B are diagrams for explaining a filtering process performed by a filtering circuit.

DESCRIPTION OF THE PREFERRED EMBODIMENTS

Figure 1:
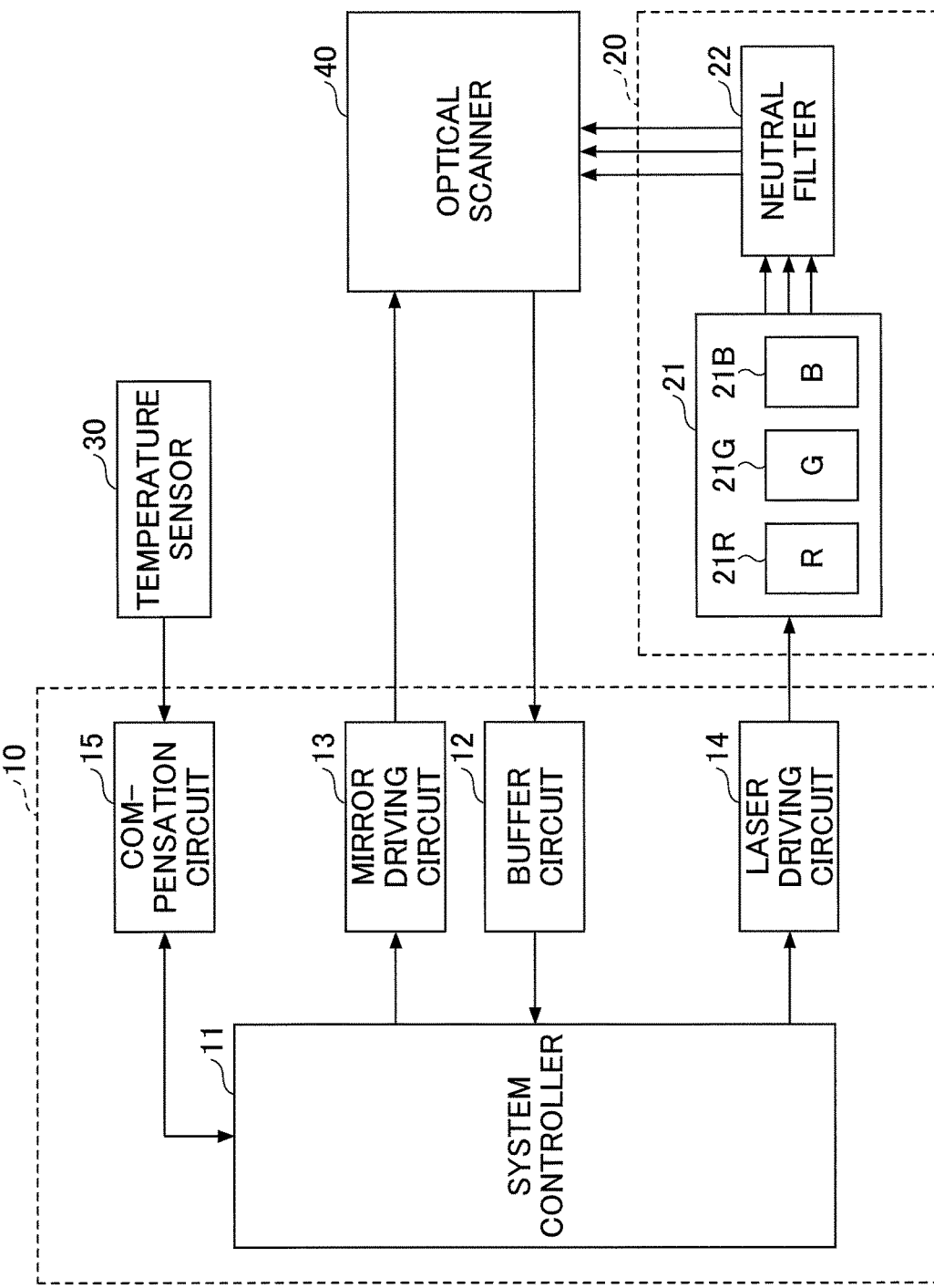
FIG. 1 is a block diagram illustrating a configuration of an optical scanning apparatus according to one embodiment.

Embodiments of the present invention will be described, by referring to the drawings. In the drawings, those parts that are the same are designated by the same reference numerals, and a repeated description of the same parts may be omitted.

One Embodiment

One embodiment will be described, by referring to the drawings. FIG. 1 is a block diagram illustrating a configuration of an optical scanning apparatus according to one embodiment.

An optical scanning apparatus 1 according to this embodiment includes an optical scan controller 10, a light source device 20, a temperature sensor 30, and an optical scanner 40. Each of these components will be described below.

The optical scan controller 10 includes a system controller 11, a buffer circuit 12, a mirror driving circuit 13, a laser driving circuit 14, and a compensation circuit 15. The optical scan controller 10 controls the light source device 20, and the optical scanner 40.

The system controller 11 supplies a control signal, that controls oscillation of a mirror of the optical scanner 40, to the mirror driving circuit 13. In addition, the system controller 11 supplies a digital video signal to the laser driving circuit 14.

The buffer circuit 12 holds data output from the optical scanner 40. More particularly, the buffer circuit 12 holds output signals or the like, output from a vertical deflection angle sensor and a horizontal deflection angle sensor, for example.

The mirror driving circuit 13 supplies a horizontal driving signal that oscillates (or drives) a mirror in a horizontal direction (or first direction) and a vertical driving signal that oscillates (or drives) the mirror in a vertical direction (or second direction perpendicular to the first direction), to the optical scanner 40, based on the control signal from the system controller 11. The mirror will be described later.

The laser driving circuit 14 supplies a laser driving signal, that drives a laser, to the light source device 20, based on the video signal from the system controller 11.

The compensation circuit 15 compensates for a phase error in a horizontal scanning direction (hereinafter also simply referred to as the "horizontal direction"), that is generated depending on a vertical position of the mirror when the mirror is driven in the vertical direction, in the optical scanner 40. The compensation circuit 15 may perform the compensation using a fixed value that is determined in advance according to the vertical position. Alternatively, the compensation circuit 15 may perform the compensation by computing a value of the phase error during the driving of the mirror. The phase error in the horizontal direction is a phase error between the horizontal driving signal supplied to the optical scanner 40 and the output signal of the horizontal deflection sensor that detects a displacement of the mirror in the horizontal direction.

The light source device 20 includes a Laser Diode (LD) module 21, and a neutral filter 22. The LD module 21 includes a laser 21R, a laser 21G, and a laser 21B.

The laser 21R, the laser 21G, and the laser 21B emit laser beams based on laser driving currents supplied from the system controller 11. The laser 21R is a red semiconductor laser that emits light having a wavelength λR (for example, 640 nm), for example. The laser 21G is a green semiconductor laser that emits light having a wavelength λG (for example, 530 nm), for example. The laser 21B is a blue semiconductor laser that emits light having a wavelength λB (for example, 445 nm), for example. The lights having the respective wavelengths, emitted from the lasers 21R, 21G, and 21B, are combined by a dichroic mirror or the like, and is passed through the neutral filter 22 that reduces a luminous energy thereof, before supplying the combined laser beam to the optical scanner 40.

The temperature sensor 30 detects an ambient temperature of the optical scanning apparatus 1, and may be formed by a thermistor or the like, for example.

The optical scanner 40 drives the mirror in the horizontal direction and the vertical direction, according to the horizontal and vertical driving signals supplied from the mirror driving circuit 13. In the optical scanner 40, a reflection direction of the incoming laser beam is changed, and the laser beam is caused to perform an optical scan, so as to project the image on a screen or the like.

Figure 2:
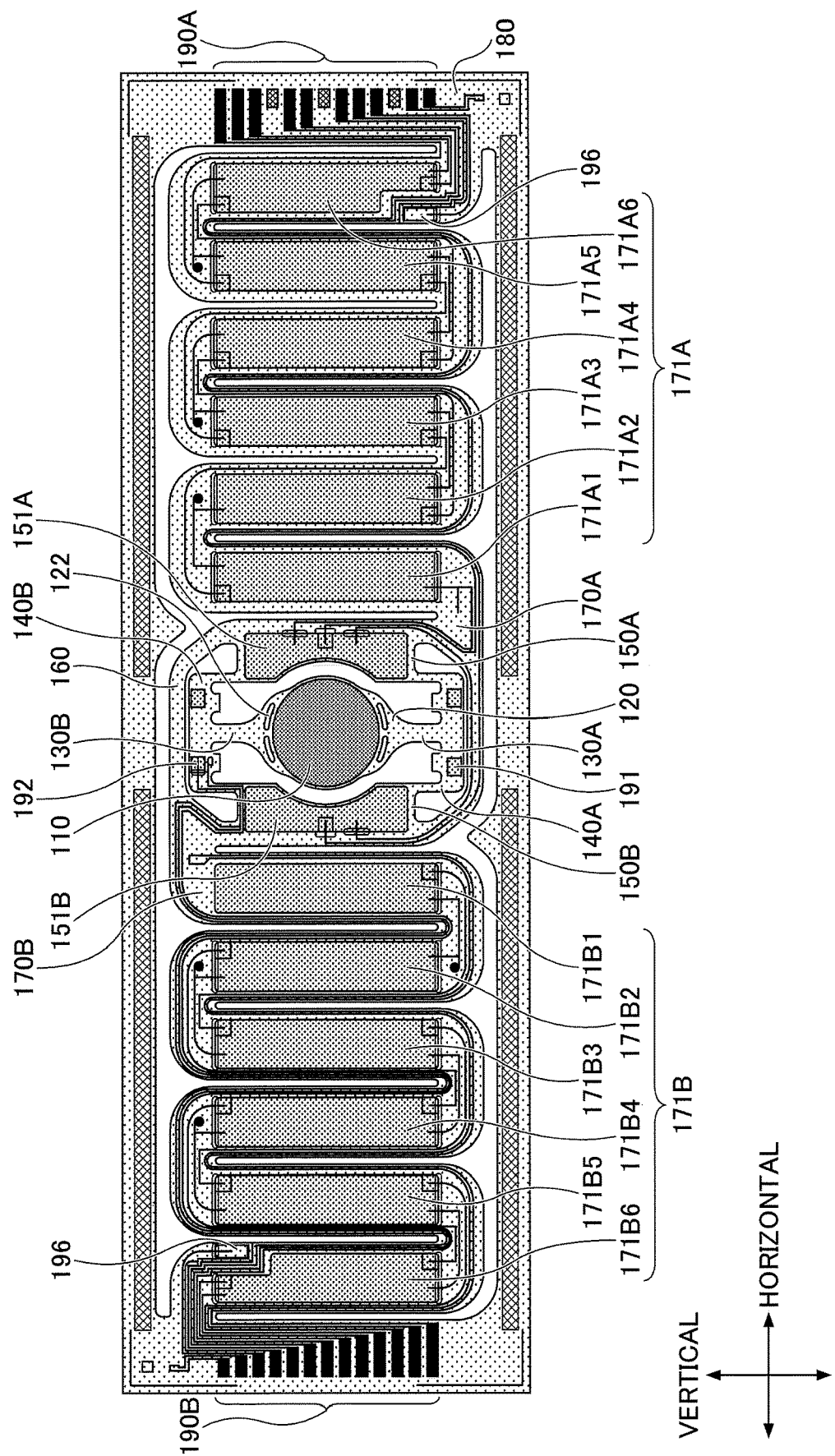
FIG. 2 is a diagram illustrating a configuration of an optical scanner.

FIG. 2 is a diagram illustrating a configuration of the optical scanner 40. The optical scanner 40 includes a MEMS that drives a mirror 110 by piezoelectric elements, for example.

The optical scanner 40 includes the mirror 110, a mirror support 120, torsion beams 130A and 130B, connecting beams 140A and 140B, first driving beams 150A and 150B, a movable frame 160, second driving beams 170A and 170B, and a fixed frame 180. In addition, the first driving beams 150A and 150B include driving sources 151A and 151B, respectively. Further, the second driving beams 170A and 170B include driving sources 171A and 171B, respectively. The first driving beams 150A and 150B, and the second driving beams 170A and 170B function as actuators that drive the mirror 110 up and down and to the left and right, to cause the laser beam to scan.

The mirror support 120 includes slits 122 formed along a circumference of the mirror 110. The slits 122 permit weight reduction of the mirror support 120, while enabling twists of the torsion beams 130A and 130B to be transferred to the mirror 110.

In the optical scanner 40, the mirror 110 is supported at an upper surface of the mirror support 120, and the mirror support 120 is connected to ends of the torsion beams 130A and 130B located on both sides of the mirror support 120. The torsion beams 130A and 130B form an oscillation axis, and extend in an axial direction to support the mirror support 120 from both sides along the axial direction. The mirror 110 supported by the mirror support 120 oscillates when the torsion beams 130A and 130B are twisted, to cause the laser beam that is irradiated on the mirror 110 to be reflected and perform a scanning operation by the reflected laser beam. The torsion beams 130A and 130B are connected to and supported by the connecting beams 140A and 140B, respectively, and connect to the first driving beams 150A and 150B, respectively.

The first driving beams 150A and 150B, the connecting beams 140A and 140B, the torsion beams 130A and 130B, the mirror support 120, and the mirror 110 are supported from an outer side by the movable frame 160. One side of each of the first driving beams 150A and 150B is supported on the movable frame 160. The other side of the first driving beam 150A extends toward an inner peripheral side and connects to the connecting beams 140A and 140B. Similarly, the other side of the first driving beam 150B extends toward the inner peripheral side and connects to the connecting beams 140A and 140B.

The first driving beams 150A and 150B are arranged as a pair sandwiching the mirror 110 and the mirror support 120 in a direction perpendicular to the torsion beams 130A and 130B. The driving sources 151A and 15B are formed on upper surfaces of the first driving beams 150A and 150B, respectively. The driving sources 151A and 151B respectively include upper electrodes formed on upper surfaces of thin films of piezoelectric elements (hereinafter also referred to as "piezoelectric thin films") on the upper surfaces of the first driving beams 150A and 150B, and lower electrodes formed on lower surfaces of the piezoelectric thin films. Each of the driving sources 151A and 151B expands and contracts according to a driving voltage applied across the upper electrode and the lower electrode thereof.

For this reason, when driving voltages having mutually inverted potentials are alternately applied to the first driving beam 150A and the first driving beam 150B, the first driving beam 150A and the first driving beam 150B on the left side and the right side of the mirror 110 alternately oscillate up and down in mutually opposite directions. Hence, by using the torsion beams 130A and 130B as the oscillation axis or a rotation axis, it is possible to oscillate the mirror 110 around the axis.

In the following description, a direction in which the mirror 110 oscillates around the axis of the torsion beams 130A and 130B, will be referred to as the horizontal direction. In other words, the first driving beam 150A and the first driving beam 150B of this embodiment twists and deforms the torsion beams 130A and 130B, to oscillate the mirror 110 in the horizontal direction (or first direction). For example, resonant oscillation may be used for the horizontal drive by the first driving beams 150A and 150B, and the mirror 110 can be driven to oscillate at a high speed.

On the other hand, one end of each of the second driving beams 170A and 170B is connected to an outer part of the movable frame 160. The second driving beams 170A and 170B are arranged as a pair sandwiching the movable frame 160 from both the left and right sides. In addition, the second driving beams 170A and 170B support the movable frame 160 from both sides, and oscillate the movable frame 160 around a predetermined axis that passes through a center of a light reflection surface of the mirror 110. The second driving beam 170A includes a plurality of (for example, an even number of) rectangular beams extending parallel to the first driving beam 150A, and the adjacent rectangular beams are connected at end parts thereof to form a zigzag shape as a whole.

The other end of the second driving beam 170A is connected to an inner side of the fixed frame 180. Similarly, the second driving beam 170B includes a plurality of rectangular beams extending parallel to the first driving beam 150B, and the adjacent rectangular beams are connected at end parts thereof to form a zigzag shape as a whole. The other end of the second driving beam 170B is connected to an inner side of the fixed frame 180.

The driving sources 171A and 171B are formed on upper surfaces of the second driving beams 170A and 170B, respectively, in rectangular units not including a curved part. The driving source 171A includes an upper electrode formed on an upper surface of a piezoelectric thin film on an upper surface of the second driving beam 170A, and a lower electrode formed on a lower surface of this piezoelectric thin film. The driving source 171B includes an upper electrode formed on an upper surface of a piezoelectric thin film on an upper surface of the second driving beam 170B, and a lower electrode formed on a lower surface of this piezoelectric thin film.

The adjacent rectangular beams of the second driving beams 170A and 170B warp up and down in mutually opposite directions, when the driving voltages having mutually inverted potentials are applied between the driving sources 171A and 171B having the adjacent rectangular units, and accumulated up and down movements of each of the rectangular beams are transferred to the movable frame 160.

By the above described operation, the second driving beams 170A and 170B oscillate the mirror 110 in the vertical direction that is perpendicular to the horizontal direction. In other words, the second driving beams 170A and 170B are vertical beams for oscillating the mirror 110 in the vertical direction. That is, the second driving beams 170A and 170B of this embodiment themselves bend and deform, to oscillate the mirror 110 in the vertical direction (or second direction).

For example, non-resonant oscillation may be used for the vertical drive by the second driving beams 170A and 170B.

The driving source 171A includes driving sources 171A1, 171A2, 171A3, 171A4, 171A5, and 171A6 that are arranged toward the right side from the movable frame 160. In addition, the driving source 171B includes driving sources 171B1, 171B2, 171B3, 171B4, 171B5, and 171B6 that are arranged toward the left side from the movable frame 160.

Driving interconnections for applying the driving voltage across the upper electrode and the lower electrode of the driving source 151A are connected to predetermined terminals included in a terminal group 190A that is provided on the fixed frame 180. In addition, driving interconnections for applying the driving voltage across the upper electrode and the lower electrode of the driving source 151B are connected to predetermined terminals included in a terminal group 190B that is provided on the fixed frame 180. Driving interconnections for applying the driving voltage across the upper electrode and the lower electrode of the driving source 171A are connected to predetermined terminals included in the terminal group 190A that is provided on the fixed frame 180. Further, driving interconnections for applying the driving voltage across the upper electrode and the lower electrode of the driving source 171B are connected to predetermined terminals included in the terminal group 190B that is provided on the fixed frame 180.

The optical scanner 40 includes piezoelectric sensors 191 and 192 that are provided as the horizontal deflection angle sensors for detecting an inclination of the mirror 110 in the horizontal direction (or horizontal deflection angle) in a state where the driving voltages are applied to the driving sources 151A and 151B and the mirror 110 oscillates in the horizontal direction. The piezoelectric sensor 191 is provided on the connecting beam 140A, and the piezoelectric sensor 192 is provided on the connecting beam 140B.

In addition, the optical scanner 40 includes piezoelectric sensors 195 and 196 that are provided as the vertical deflection angle sensors for detecting an inclination of the mirror 110 in the vertical direction (or vertical deflection angle) in a state where the driving voltages are applied to the driving sources 171A and 171B and the mirror 110 oscillates in the vertical direction. The piezoelectric sensor 195 is provided on one of the rectangular beams of the second driving beam 170A, and the piezoelectric sensor 196 is provided on one of the rectangular beams of the second driving beam 170B.

The piezoelectric sensor 191 outputs a current value corresponding to a displacement of the connecting beam 140A transferred from the torsion beam 130A, according to the inclination of the mirror 110 in the horizontal direction. The piezoelectric sensor 192 outputs a current value corresponding to a displacement of the connecting beam 140B transferred from the torsion beam 130B, according to the inclination of the mirror 110 in the horizontal direction. The piezoelectric sensor 195 outputs a current value corresponding to a displacement of the rectangular beam of the second driving beam 170A where the piezoelectric sensor 195 is provided, according to the inclination of the mirror 110 in the vertical direction. The piezoelectric sensor 196 outputs a current value corresponding to a displacement of the rectangular beam of the second driving beam 170B where the piezoelectric sensor 196 is provided, according to the inclination of the mirror 110 in the vertical direction.

In this embodiment, the inclination of the mirror 110 in the vertical direction is detected using the outputs of the piezoelectric sensors 195 and 196. A voltage output from each of the piezoelectric sensors 195 and 196 is held in the buffer circuit 12. The voltage held in the buffer circuit 12 may be the voltage output from one of the piezoelectric sensors 195 and 196.

The compensation circuit 15 compensates for an emission timing of the laser beam emitted from the light source device 20, based on the voltage held in the buffer circuit 12.

Each of the piezoelectric sensors 191, 192, 195, and 196 includes the upper electrode formed on the upper surface of the piezoelectric thin film, and the lower electrode formed on the lower surface of the piezoelectric thin film. In this embodiment, the output of each piezoelectric sensor becomes a current value of sensor interconnections connected to the upper electrode and the lower electrode.

The sensor interconnections drawn out from the upper electrode and the lower electrode of the piezoelectric sensor 191 are connected to predetermined terminals included in the terminal group 190B provided on the fixed frame 180. In addition, the sensor interconnections drawn out from the upper electrode and the lower electrode of the piezoelectric sensor 195 are connected to predetermined terminals included in the terminal group 190A provided on the fixed frame 180. The sensor interconnections drawn out from the upper electrode and the lower electrode of the piezoelectric sensor 192 are connected to predetermined terminals included in the terminal group 190A provided on the fixed frame 180.

Further, the sensor interconnections drawn out from the upper electrode and the lower electrode of the piezoelectric sensor 196 are connected to predetermined terminals included in the terminal group 190B provided on the fixed frame 180.

Figure 3:
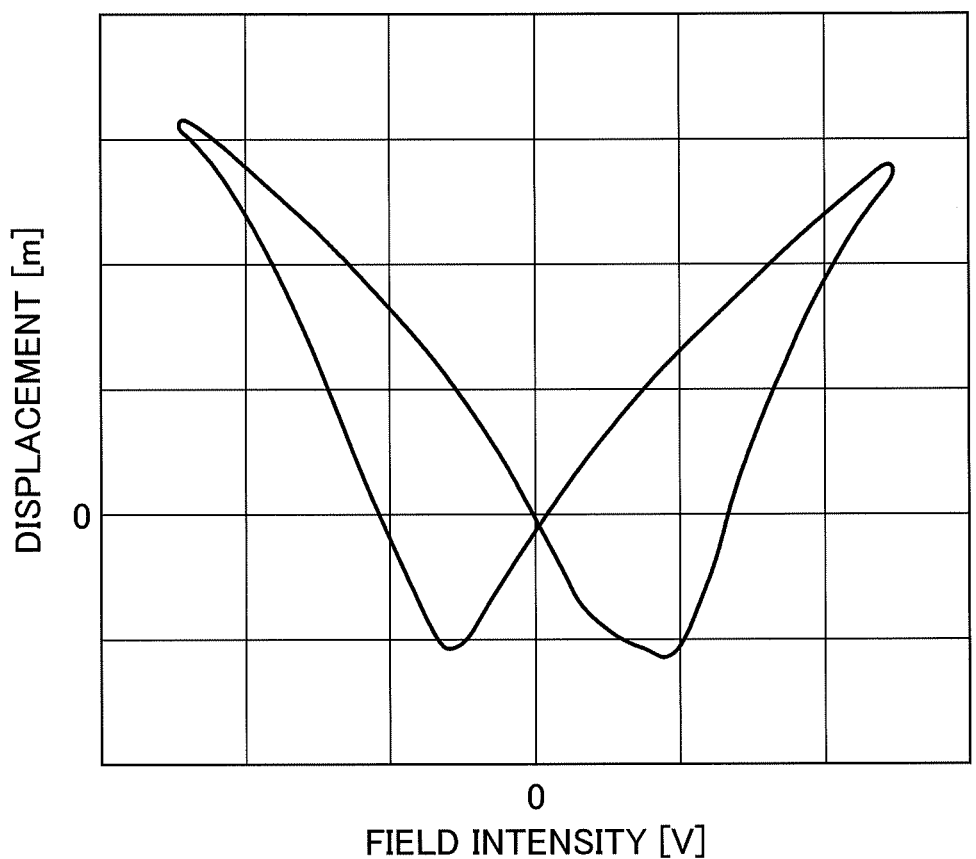
FIG. 3 is a diagram illustrating an example of a characteristic of a piezoelectric element.

Next, a characteristic of the piezoelectric element used for the driving sources 151A and 151B and the driving sources 171A and 171B will be described. FIG. 3 is a diagram illustrating an example of the characteristic of the piezoelectric element.

In this embodiment, the piezoelectric element having the characteristic illustrated in FIG. 3, for example, may be used for the piezoelectric elements forming the driving sources 151A and 151B and the driving sources 171A and 171B. In the example illustrated in FIG. 3, a relationship between a field intensity applied to the piezoelectric element and a displacement of the piezoelectric element is a hysteresis characteristic, however, the relationship becomes approximately linear in a region where the field intensity is close to zero.

The horizontal driving signal and the vertical driving signal generated by the mirror driving circuit 13 are preferably in a voltage region where the relationship between the electric intensity and the displacement is approximately linear.

Figure 4A:
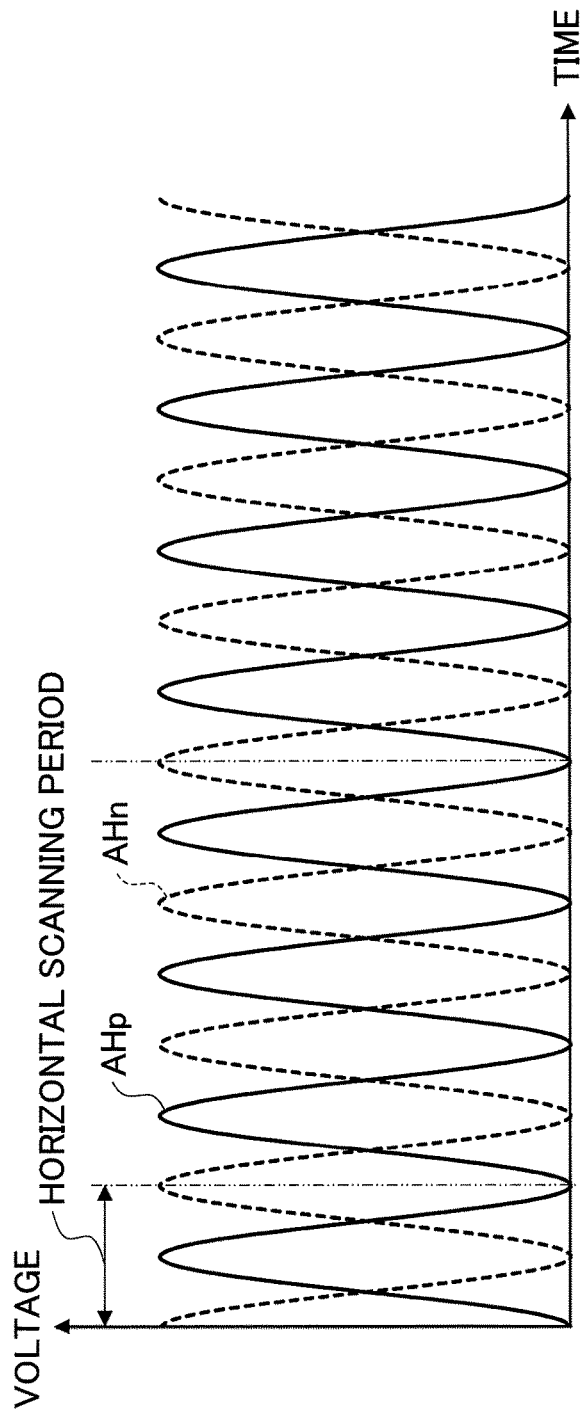
FIG. 4A and FIG. 4B are diagrams respectively illustrating examples of a horizontal driving signal and a vertical driving signal.
Figure 4B:
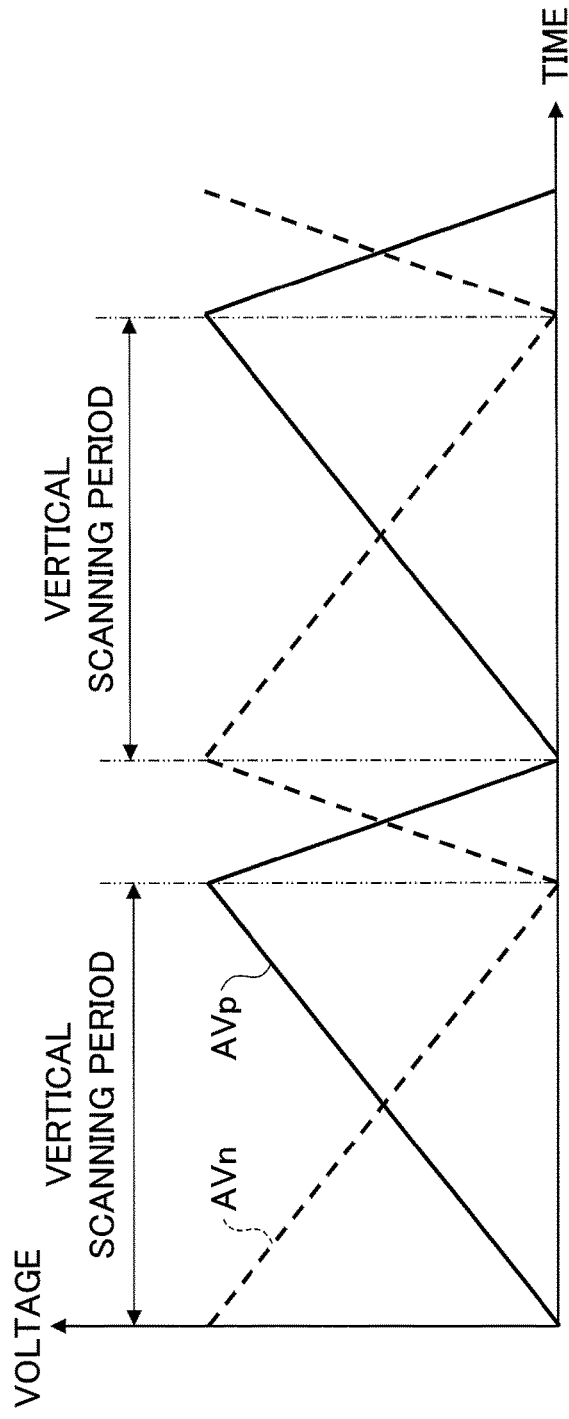

FIG. 4A and FIG. 4B are diagrams respectively illustrating examples of the horizontal driving signal and the vertical driving signal. FIG. 4A illustrates the example of the horizontal driving signal. FIG. 4B illustrates the example of the vertical driving signal.

The horizontal driving signal includes a first horizontal driving signal AHp applied to the driving source 151A, and a second horizontal driving signal AHn applied to the driving source 151B. For example, the first horizontal driving signal AHp and the second horizontal driving signal AHn are both sinusoidal waves having the same period and amplitude. The phase of the second horizontal driving signal AHn is shifted by one-half period with respect to the phase of the first horizontal driving signal AHp. In other words, the first horizontal driving signal AHp and the second horizontal driving signal AHn have mutually inverted potentials with respect to an intermediate potential, such that the second horizontal driving signal AHn has the potential inverted with respect to the intermediate potential of the first horizontal driving signal AHp, and vice versa.

The mirror 110 is driven according to a potential difference between the first horizontal driving signal AHp and the second horizontal driving signal AHn. The horizontal deflection angle of the mirror 110 corresponds to the amplitudes of the first horizontal driving signal AHp and the second horizontal driving signal AHn.

The vertical driving signal includes a first vertical driving signal AVp applied to the driving source 171A, and a second vertical driving signal AVn applied to the driving source 171B. For example, the first vertical driving signal AVp and the second vertical driving signal AVn are both sawtooth waves having the same period and amplitude. The first vertical driving signal AVp and the second vertical driving signal AVn have mutually inverted potentials with respect to an intermediate potential, such that the second vertical driving signal AVn has the potential inverted with respect to the intermediate potential of the first vertical driving signal AVp, and vice versa.

The mirror 110 is driven according to a potential difference between the first vertical driving signal AVp and the second vertical driving signal AVn. The vertical deflection angle of the mirror 110 corresponds to the amplitudes of the first vertical driving signal AVp and the second vertical driving signal AVn.

Figure 5:
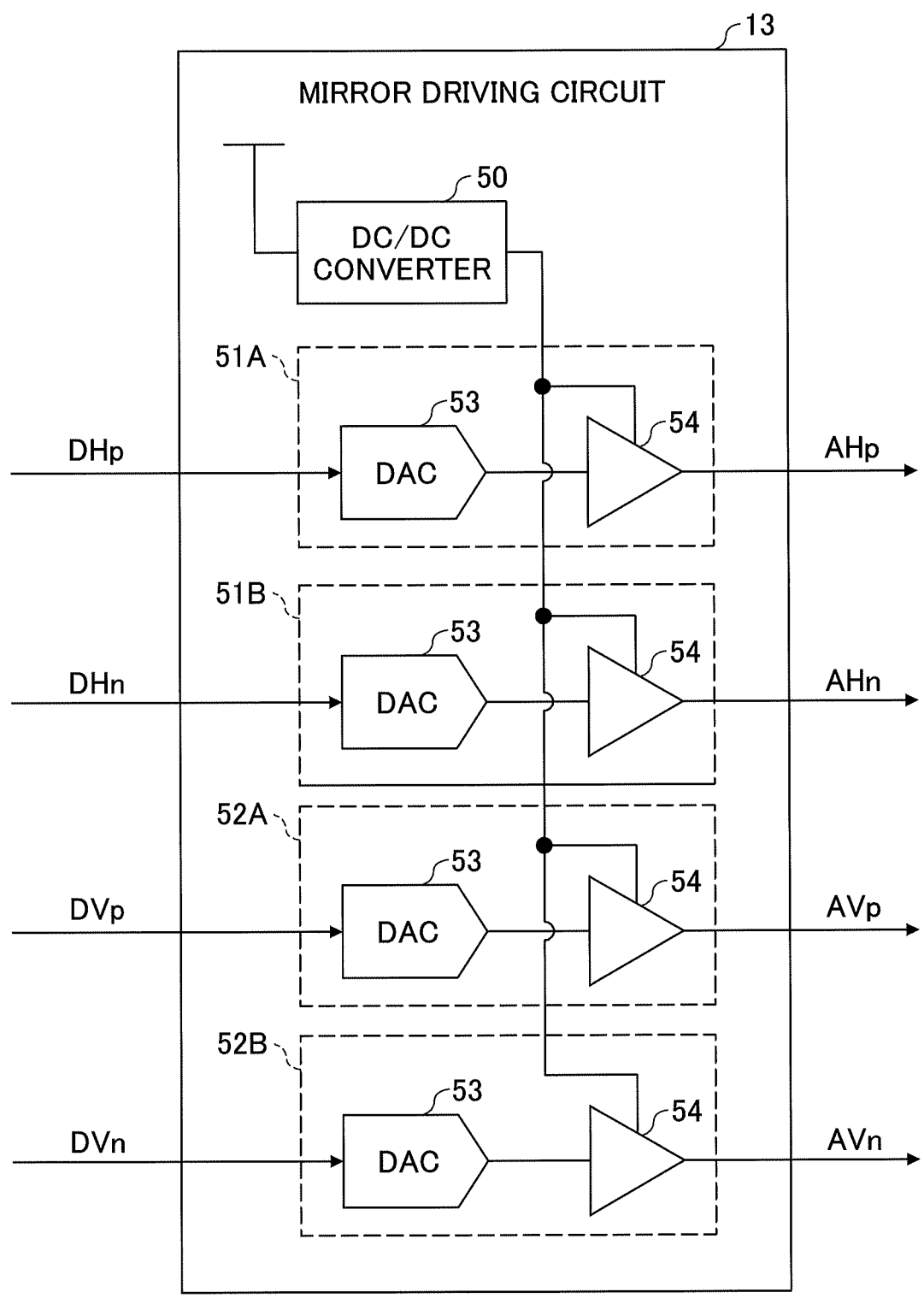
FIG. 5 is a diagram illustrating a configuration of a mirror driving circuit.

Next, a configuration of the mirror driving circuit 13 will be described. FIG. 5 is a diagram illustrating the configuration of the mirror driving circuit 13.

As illustrated in FIG. 5, the mirror driving circuit 13 includes a DC-DC converter 50, a first horizontal driving signal generator 51A, a second horizontal driving signal generator 51B, a first vertical driving signal generator 52A, and a second vertical driving signal generator 52B. Each of the first horizontal driving signal generator 51A, the second horizontal driving signal generator 51B, the first vertical driving signal generator 52A, and the second vertical driving signal generator 52B includes a DAC 53, and an operational amplifier 54 which is an example of an amplifier.

The DAC 53 converts a digital waveform data supplied from the system controller 11 into an analog signal. The operational amplifier 54 amplifies the analog signal output from the DAC 53 by the conversion performed therein, and outputs the amplified analog signal as the driving signal.

The first horizontal driving signal generator 51A generates the first horizontal driving signal AHp based on a first horizontal driving waveform data DHp. The second horizontal driving signal generator 51B generates the second horizontal driving signal AHn based on a second horizontal driving waveform data DHn. The first vertical driving signal generator 52A generates the first vertical driving signal AVp based on a first vertical driving waveform data DVp. The second vertical driving signal generator 52B generates the second vertical driving signal AVn based on a second vertical driving waveform data DVn.

Figure 6:
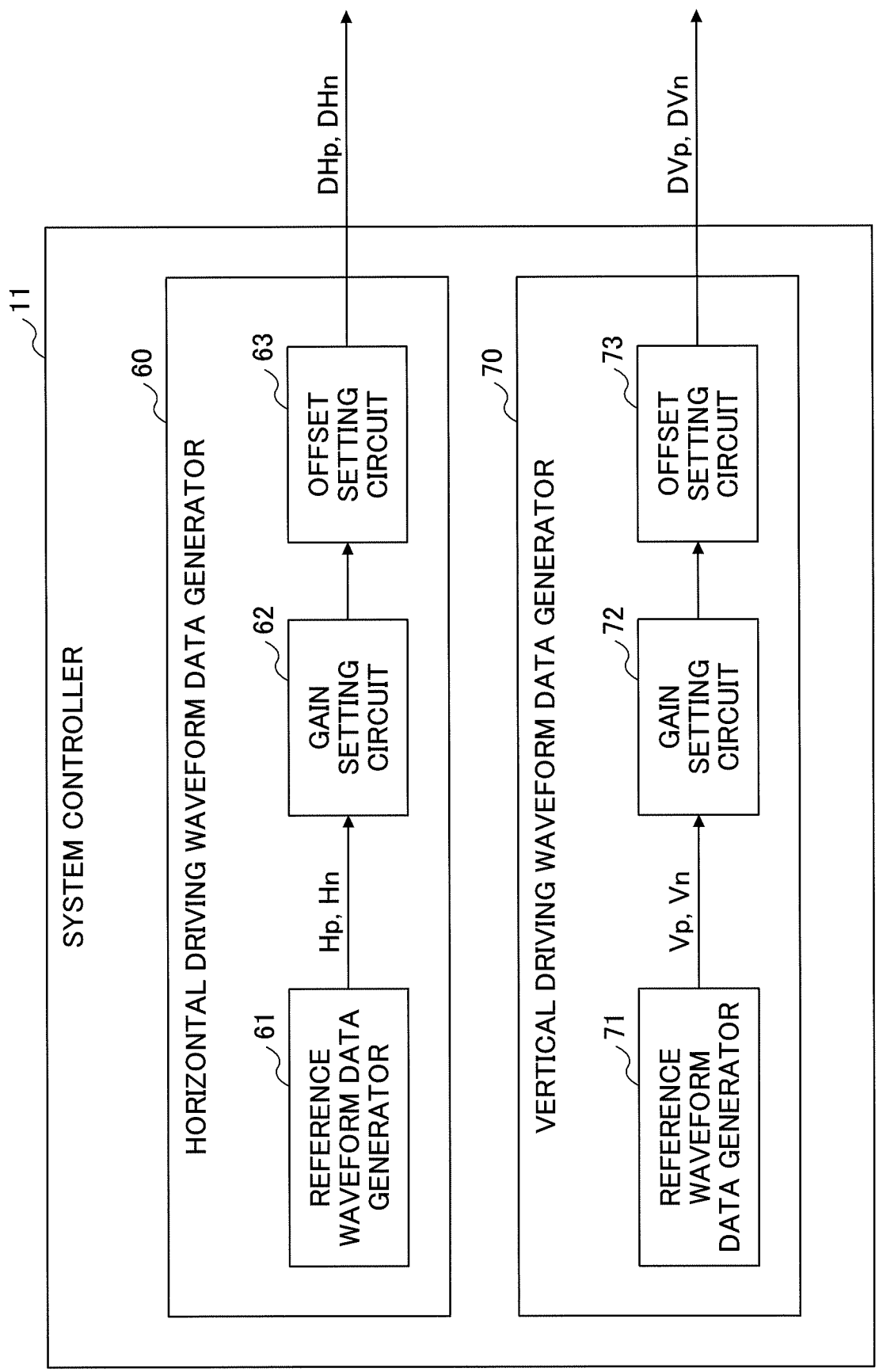
FIG. 6 is a block diagram illustrating configurations of a horizontal driving waveform data generator and a vertical driving waveform data generator.

Next, a horizontal driving waveform data generator and a vertical driving waveform data generator within the system controller 11 will be described. FIG. 6 is a block diagram illustrating configurations of a horizontal driving waveform data generator 60 and a vertical driving waveform data generator 70.

The system controller 11 is formed by constituent elements including a Central Processing Unit (CPU), a Read Only Memory (ROM), a Random Access Memory (RAM), or the like. However, the system controller 11 may be formed by a Field Programmable Gate Array (FPGA) or the like, for example.

The horizontal driving waveform data generator 60 includes a reference waveform data generator 61, a gain setting circuit 62, and an offset setting circuit 63.

Figure 7B:
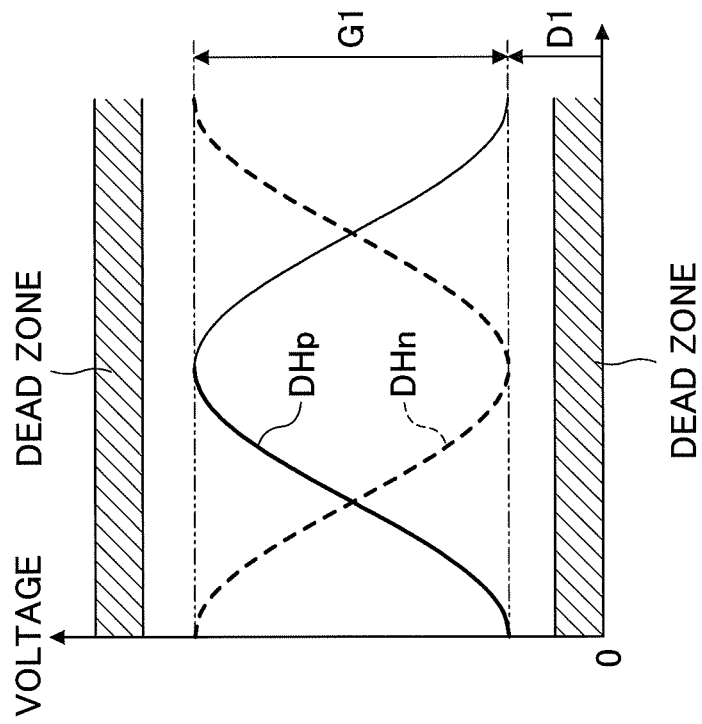
FIG. 7A and FIG. 7B are diagrams for explaining a gain process and an offset process with respect to a horizontal reference waveform data.
Figure 7A:
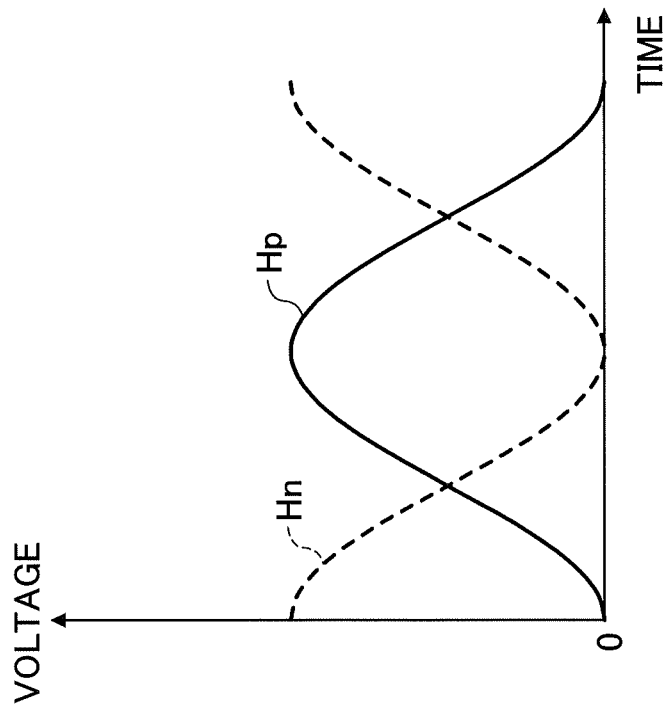

The reference waveform data generator 61 generates a first horizontal reference waveform data Hp, and a second horizontal reference waveform data Hn. As illustrated in FIG. 7A, the first horizontal reference waveform data Hp and the second horizontal reference waveform data Hn are sinusoidal waves having the same period and amplitude. The phase of the second horizontal reference waveform data Hn is shifted by one-half period with respect to the phase of the first horizontal reference waveform data Hp.

Based on the first horizontal reference waveform data Hp and the second horizontal reference waveform data Hn, the first horizontal driving waveform data DHp and the second horizontal driving waveform data DHn, which are digital data, are generated by the gain setting circuit 62 and the offset setting circuit 63.

The gain setting circuit 62 sets a gain G1 of the first horizontal driving waveform data DHp and the second horizontal driving waveform data DHn, based on detection values of the piezoelectric sensors 191 and 192 that are provided as the horizontal deflection angle sensors. The gain G1 corresponds to the amplitudes of the first horizontal driving waveform data DHp and the second horizontal driving waveform data DHn.

The offset setting circuit 63 offsets the voltages so that the first horizontal driving waveform data DHp and the second horizontal driving waveform data DHn do not overlap a dead zone (or dead band) of the operational amplifier 54. As illustrated in FIG. 7B, the dead zone of the operational amplifier 54 is generated on both sides, on the power supply voltage side and the ground potential side. In other words, the offset setting circuit 63 sets an offset value D1 so that the first horizontal driving waveform data DHp and the second horizontal driving waveform data DHn are positioned between the dead zones on the power supply voltage side and the ground potential side.

The vertical driving waveform data generator 70 includes a reference waveform data generator 71, a gain setting circuit 72, and an offset setting circuit 73.

The reference waveform data generator 71 generate a first vertical reference waveform data Vp, and a second vertical reference waveform data Vn. As illustrated in FIG. 8A, the first vertical reference waveform data Vp and the second vertical reference waveform data Vn are sawtooth waveforms having the same period and amplitude. The potential of the second vertical reference waveform data Vn is inverted with respect to the potential of the first vertical reference waveform data Vp.

Based on the first vertical reference waveform data Vp and the second vertical reference waveform data Vn, the first vertical driving waveform data DVp and the second vertical driving waveform data DVn, which are digital data, are generated by the gain setting circuit 72 and the offset setting circuit 73.

The gain setting circuit 72 sets a gain G2 of the first vertical driving waveform data DVp and the second vertical driving waveform data DVn, based on detection values of the piezoelectric sensors 195 and 196 that are provided as the vertical deflection angle sensors. The gain G2 corresponds to the amplitudes of the first vertical driving waveform data DVp and the second vertical driving waveform data DVHn.

The offset setting circuit 73 offsets the voltages so that the first vertical driving waveform data DVp and the second vertical driving waveform data DVn do not overlap the dead zone of the operational amplifier 54. As illustrated in FIG. 8B, the dead zone of the operational amplifier 54 is generated on both sides, on the power supply voltage side and the ground potential side. In other words, the offset setting circuit 73 sets an offset value D2 so that the first vertical driving waveform data DVp and the second vertical driving waveform data DVn are positioned between the dead zones on the power supply voltage side and the ground potential side.

Further, the offset setting circuit 73 sets the offset value D2 so as to reduce the generation of the undesired resonant oscillation caused by the INL error of the DAC 53 superimposed on the driving signal. The INL error represents a value of a deviation of an output value that is actually measured with respect to a digital input value of the DAC 53 from an ideal output value.

Figure 9:
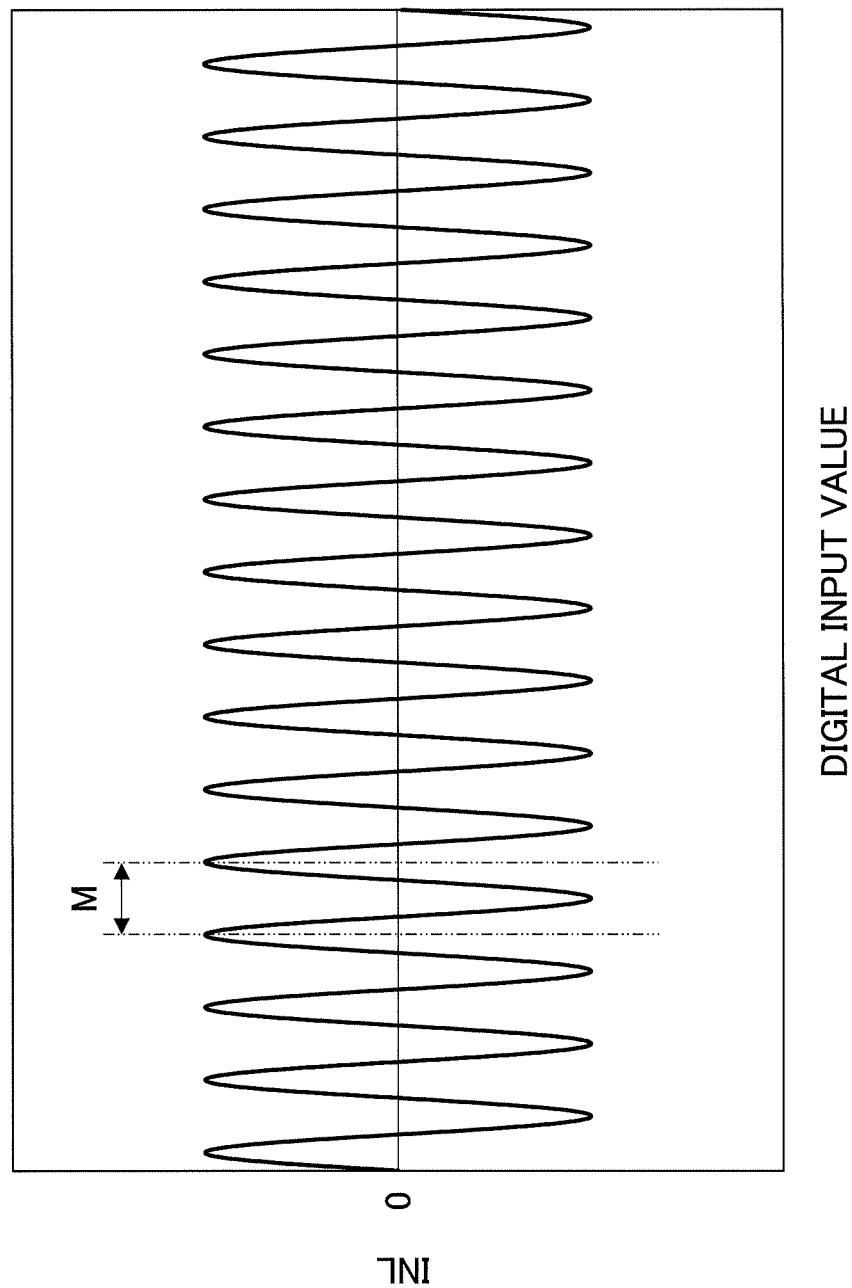
FIG. 9 is a diagram illustrating a characteristic of an INL error that is periodic and is generated by a DAC.

FIG. 9 is a diagram illustrating a characteristic of the INL error that is periodic and is generated by the DAC 53. As illustrated in FIG. 9, the INL error indicates a periodic change with respect to the digital input value. The change of the INL error is a sinusoidal wave having a period M, for example.

Figure 10A:
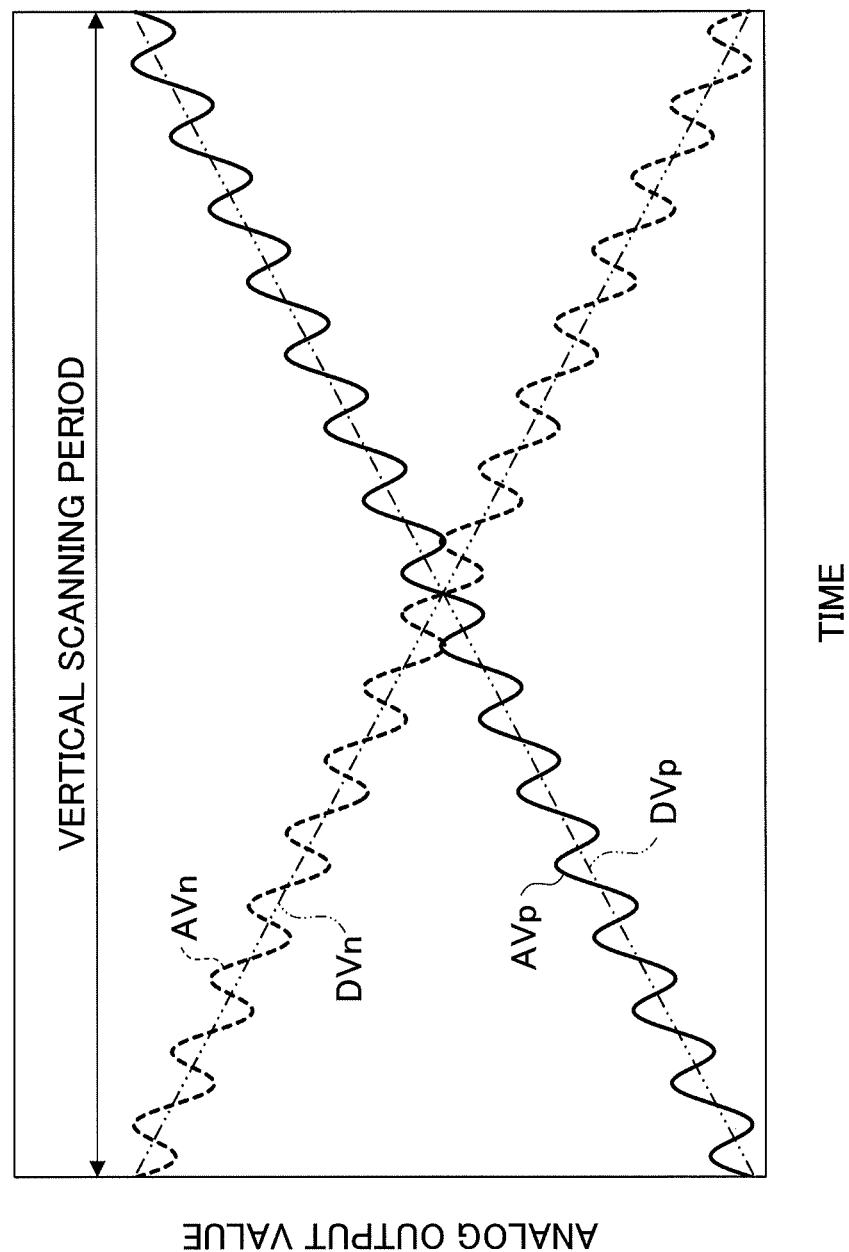

FIG. 10A is a diagram illustrating examples of the first vertical driving signal AVp and the second vertical driving signal AVn superimposed with the INL error due to the DAC 53.

During a vertical scanning period, the first vertical driving waveform data DVp increases with time, while the second vertical driving waveform data DVn decreases with time. For this reason, a phase error occurs between the INL error superimposed on the first vertical driving signal AVp and the INL error superimposed on the second vertical driving signal AVn, depending on the relationship of the first vertical driving waveform data DVp and the second vertical driving waveform data DVn.

In the example illustrated in FIG. 10A, a phase error amounting to one-half period (M/2) occurs between the INL error superimposed on the first vertical driving signal AVp and the INL error superimposed on the second vertical driving signal AVn.

FIG. 10B is a diagram illustrating a potential difference between the first vertical driving signal AVp and the second vertical driving signal AVn of FIG. 10A. Because the phase error occurs between the INL error superimposed on the first vertical driving signal AVp and the INL error superimposed on the second vertical driving signal AVn, the potential difference (AVp−AVn) becomes a function that is superimposed with a sinusoidal wave having two times the amplitude of the INL error on a linear function, as illustrated in FIG. 10B.

The mirror 110 is displaced in the vertical direction according to the potential difference (AVp−AVn), and thus, the displacement may become non-linear when the potential difference illustrated in FIG. 10B is applied, to generate the ringing in the image. The ringing refers to a wave pattern artifact generated in the image.

In this embodiment, the offset setting circuit 73 sets the offset value D2 to a minimum value of D2 satisfying the following formula (1) and relationship (2), where n denotes a positive integer, M denotes a period of the sinusoidal wave of the change of the INL error, G2 denotes a gain G2 of the first vertical driving waveform data DVp and the second vertical driving waveform data, and Dth denotes an upper limit value of the dead zone on the ground potential side of the operational amplifier 54 illustrated in FIG. 8B. The upper limit value Dth may be 2V, for example.

$$D2=(n\times M+M/2-G2)/2 \quad (1)$$

$$D2>Dth \quad (2)$$

Figure 11A:
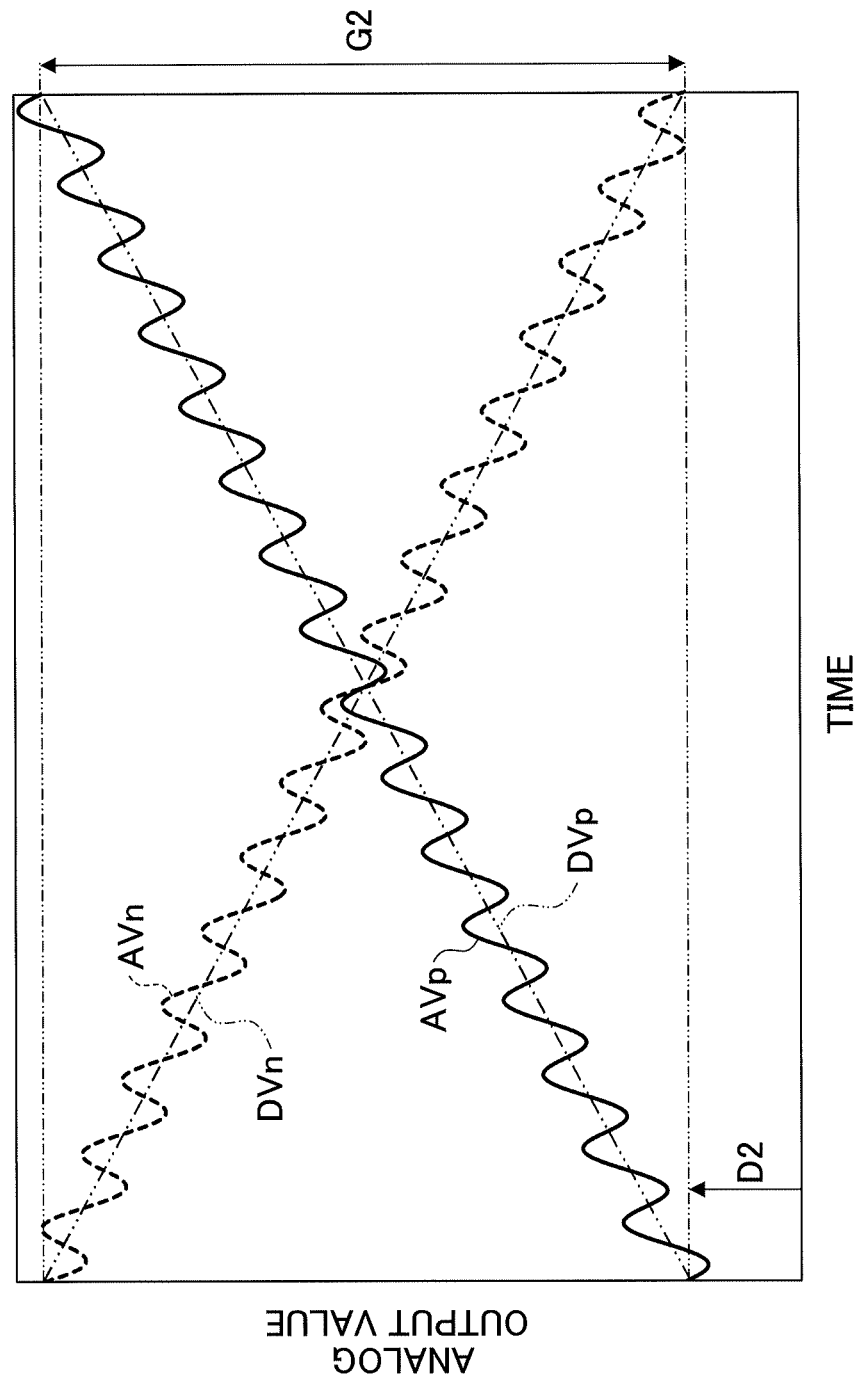
FIG. 11A and FIG. 11B are diagrams respectively illustrating the first vertical driving signal and the second vertical driving signal superimposed with INL errors that have the same phase, and the potential difference between the first vertical driving signal and the second vertical driving signal.
Figure 11B:
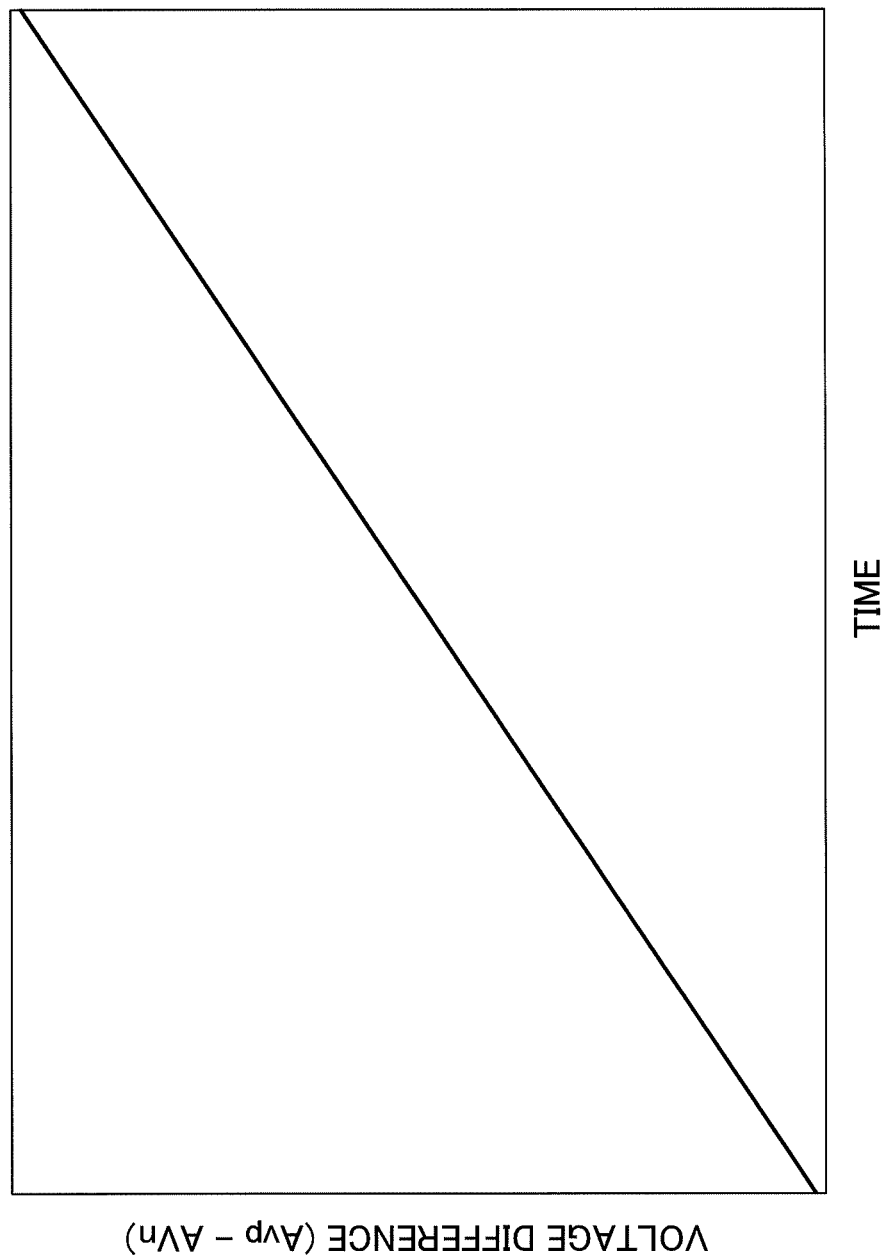

When the above described formula (1) and relationship (2) are satisfied, the phase of the INL error superimposed on the first vertical driving signal AVp and the phase of the INL error superimposed on the second vertical driving signal AVn match, as illustrated in FIG. 11A. In this case, the potential difference (AVp−AVn) becomes a linear function because the INL errors cancel each other, as illustrated in FIG. 11B.

Accordingly, when the above described formula (1) and relationship (2) are satisfied, the displacement of the mirror 110 becomes linear, to reduce the generation of the ringing.

In addition, when the offset value D2 is set to the minimum value of D2 satisfying the above described formula (1) and relationship (2), it is possible to prevent the first vertical driving signal AVp and the second vertical driving signal AVn from overlapping the dead zone on the power supply voltage side of the operational amplifier 54.

Figure 12:
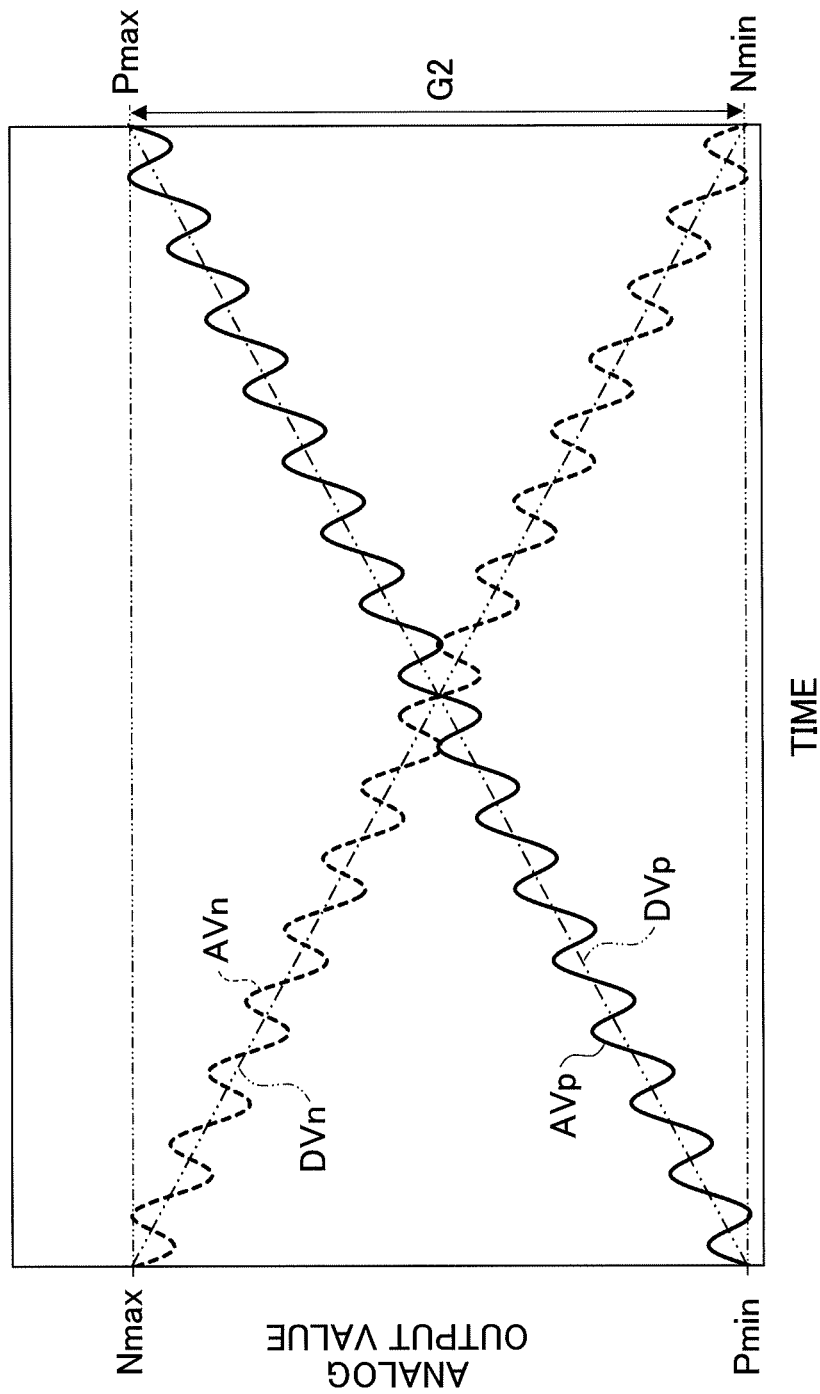
FIG. 12 is a diagram for explaining definitions of minimum values and maximum values of the first vertical driving waveform data and the second vertical driving waveform data.

Next, a method of deriving the above described formula (1) will be described. As illustrated in FIG. 12, a minimum value and a maximum value of the first vertical driving waveform data DVp are denoted by Pmin and Pmax, respectively. In addition, a minimum value and a maximum value of the second vertical driving waveform data DVn are denoted by Nmin and Nmax, respectively. Further, it is assumed that Pmin=Nmin, and Nmax=Pmax.

In FIG. 12, the phase error amounting to one-half period (M/2) exists between the phase of the INL error superimposed on the first vertical driving signal AVp and the phase of the INL error superimposed on the second vertical driving signal AVn, similar to FIG. 10A.

Figure 13:
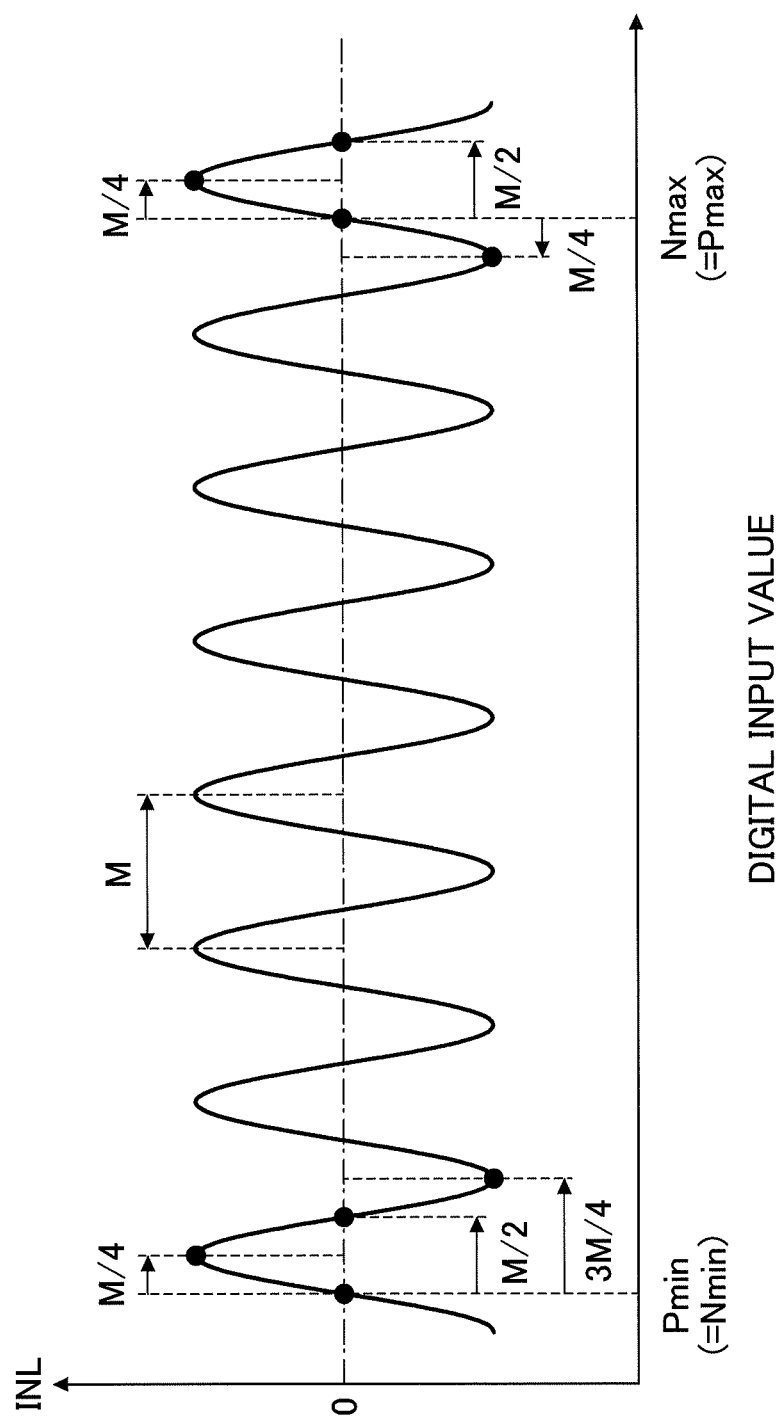
FIG. 13 is a diagram illustrating a relationship of the minimum value and the maximum value, with respect to the INL error.

FIG. 13 is a diagram illustrating a relationship of the minimum value Pmin and the maximum value Nmax, with respect to the INL error. As illustrated in FIG. 13, in the example illustrated in FIG. 12, a difference between the maximum value Nmax and the minimum value Pmin is an integer multiple (n×M) of the period M.

Because the first vertical driving waveform data DVp increases with time, the INL error changes in a direction to increase from the minimum value Pmin, and the second vertical driving waveform data DVn decreases with time. Accordingly, a phase error amounting to one-half period occurs between the phases of the INL errors.

In order to match the phases of the INL errors, at least one of the minimum value Pmin and the maximum value Nmax may be varied, so that the minimum value Pmin and the maximum value Nmax become bilaterally symmetrical in FIG. 13 with respect to the change of the INL error. For example, M/2 may be added to the minimum value Pmin, without varying the maximum value Nmax. Accordingly, the increasing or decreasing direction becomes the same for the INL errors, and the phases of the INL errors match.

In another example, M/4 may be added to each of the minimum value Pmin and the maximum value Pmax. In still another example, 3M/4 may be added to the minimum value Pmin, and M/4 may be subtracted from the maximum value Nmax. In a further example, M/2 may be added to the maximum value Nmax, without varying the minimum value Pmin. In each case, the increasing or decreasing direction becomes the same for the INL errors, and the phases of the INL errors match.

Accordingly, in order to match the phases of the INL errors, the minimum value Pmin and the maximum value Nmax satisfy the following formula (3), and the gain G2 described above satisfies the following formula (4).

$$N\text{max}+P\text{min}=n\times M+M/2 \quad (3)$$

$$N\text{max}-P\text{min}=G2 \quad (4)$$

The following formula (5) may be obtained from the above described formulas (3) and (4).

$$P\text{min}=(n\times M+M/2-G2)/2 \quad (5)$$

In this embodiment, because the offset setting circuit 73 sets the value of the minimum value Pmin (=Nmin) as the offset value D2, the above described formula (1) may be obtained from the above described formula (5).

According to this embodiment, it is possible to reduce the waveform distortion of the driving voltage caused by the dead zone of the operational amplifier 54 and the INL error of the DAC 53. In other words, it is possible to reduce the undesired resonant oscillation superimposed on the non-resonant oscillation of the mirror 110 in the vertical direction. As a result, the generation of the ringing can be reduced.

In addition, although the power consumption increases as the offset value D2 set by the offset setting circuit 73 becomes larger, this embodiment sets the offset value D2 to the minimum value of D2 satisfying the above described formula (1) and relationship (2). For this reason, it is possible to minimize the amount of increase of the power consumption caused by the offset.

Modification

Figure 14:
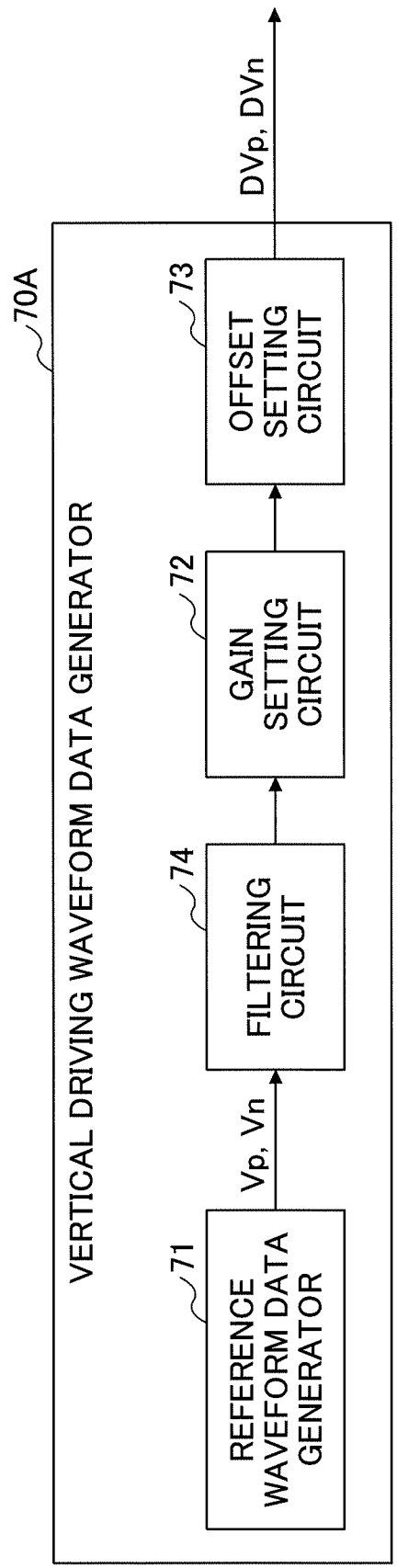
FIG. 14 is a block diagram illustrating a configuration of the vertical driving waveform data generator used in a modification.

A modification of the one embodiment will be described. FIG. 14 is a block diagram illustrating a configuration of a vertical driving waveform data generator 70A used in this modification. In this modification, the vertical driving waveform data generator 70A is used in place of the vertical driving waveform data generator 70 of the one embodiment.

As illustrated in FIG. 14, the vertical driving waveform data generator 70A differs from the vertical driving waveform data generator 70 of the one embodiment, in that a filtering circuit 74 is provided in a stage following the reference waveform data generator 71.

The filtering circuit 74 may be a smoothing filter that eliminates a high-frequency component, for example. The filtering circuit 74 performs a filtering process with respect to the first vertical reference waveform data Vp and the second vertical reference waveform data Vn, to reduce the undesired resonant oscillation in advance.

FIG. 15A and FIG. 15B are diagrams for explaining the filtering process performed by the filtering circuit 74. FIG. 15A illustrates the first vertical reference waveform data Vp and the second vertical reference waveform data Vn before the filtering process. FIG. 15B illustrates the first vertical reference waveform data Vp and the second vertical reference waveform data Vn after the filtering process.

Because the first vertical reference waveform data Vp and the second vertical reference waveform data Vn are sawtooth waves, apex angle parts of the sawtooth waves are smoothened by the filtering process. As a result, the undesired resonant oscillation generated by the apex angle parts of the sawtooth waves can be eliminated in advance.

In each of the embodiments described above, the reference waveform data generator 61 or 71 generates a pair of reference waveform data having mutually inverted potentials with respect to the intermediate potential, however, the reference waveform data generator 61 or 71 may generate only one of the pair of reference waveform data. In this case, after setting the offset by the offset setting circuit 63 or 73, the other of the pair of reference waveform data may be generated by inverting the potential of the offset one of the pair of reference waveform data with respect to the intermediate potential.

In addition, although the gain (or amplitude) of the driving signals is adjusted according to the detection values of the deflection angle sensors in each of the embodiments described above, the amplitude of the driving signals may be constant.

Moreover, each of the embodiments described above may be applied to a two-dimensional scan type optical scanning apparatus, such as an eyewear, a projector, or the like, for example.

Although each of the embodiments are described for the example in which the optical scanning apparatus is the two-dimensional scan type optical scanning apparatus, the optical scanning apparatus is not limited to the two-dimensional scan type, and may be a one-dimensional scan type optical scanning apparatus that oscillates the mirror in one direction.

According to the embodiments described above, it is possible to reduce the generation of the ringing.

Further, the present invention is not limited to these embodiments, but various variations, modifications, and substitutions of a part or all of the embodiments may be made without departing from the scope of the present invention.

The first vertical driving waveform data DVp and the second vertical driving waveform data DVn are an example of the driving waveform data. The first vertical driving signal AVp and the second vertical driving signal AVn are an example of the pair of driving signals. The first vertical driving signal AVp is an example of the first driving signal, and the second vertical driving signal AVn is an example of the second driving signal. The first vertical reference waveform data Vp and the second vertical reference waveform data Vn are an example of the reference waveform data.

What is claimed is:

1. An optical scanning apparatus that oscillates a mirror in at least one direction, comprising:
    a mirror driving circuit, including a digital-to-analog converter and an amplifier, configured to generate a pair of driving signals for driving the mirror based on digital driving waveform data;
    a reference waveform data generator configured to generate a reference waveform data; and
    an offset setting circuit configured to set an offset value of the reference waveform data, based on a dead band of the amplifier and a periodic integral non-linearity error of the digital-to-analog converter, to generate a driving waveform data.

2. The optical scanning apparatus as claimed in claim 1, wherein
    the pair of driving signals include a first driving signal, and a second driving signal having a potential inverted with respect to an intermediate potential of the first driving signal, and
    the mirror driving circuit drives the mirror according to a potential difference between the first driving signal and the second driving signal.

3. The optical scanning apparatus as claimed in claim 2, wherein the offset setting circuit sets the offset value to a value, that is larger than an upper limit value of a dead zone on a ground potential side of the amplifier, and matches a phase of the integral non-linearity error superimposed on the first driving signal and a phase of the integral non-linearity error superimposed on the second driving signal.

4. The optical scanning apparatus as claimed in claim 3, wherein
    the first driving signal and the second driving signal are sawtooth waves, and
    the mirror driving circuit causes a non-resonant oscillation of the mirror.

5. The optical scanning apparatus as claimed in claim 4, further comprising:
    a deflection angle sensor configured to detect a position of the mirror along the one direction; and
    a gain setting circuit configured to set a gain corresponding to amplitudes of the first driving signal and the second driving signal, based on a detection value of the deflection angle sensor.

6. The optical scanning apparatus as claimed in claim 5, wherein the offset setting circuit sets the offset value to a minimum value of D satisfying a formula $D=(n \times M+M/2-G)/2$ and a relationship $D>D_{th}$, where n denotes a positive integer, M denotes a period of a change of the integral non-linearity error, G denotes a gain of the driving waveform data, and $D_{th}$ denotes an upper limit value of the dead zone on the ground potential side of the amplifier.

7. A method of controlling an optical scanning apparatus that includes a mirror driving circuit, including a digital-to-analog converter and an amplifier, and configured to generate a pair of driving signals for driving a mirror based on digital driving waveform data, and oscillate the mirror in at least one direction, the method comprising:
    generating a reference waveform data; and
    setting an offset value of the reference waveform data, based on a dead band of the amplifier and a periodic integral non-linearity error of the digital-to-analog converter, to generate a driving waveform data.

8. The method of controlling the optical scanning apparatus as claimed in claim 7, wherein the generating and the setting are performed by a system controller included in the optical scanning apparatus.

9. The method of controlling the optical scanning apparatus as claimed in claim 8, wherein the generating and the setting are performed by a processor of the system controller, configured to execute a program stored in a memory of the system controller.

10. The method of controlling the optical scanning apparatus as claimed in claim 8, wherein the pair of driving signals include a first driving signal, and a second driving signal having a potential inverted with respect to an intermediate potential of the first driving signal, and further comprising:
    driving the mirror, by a mirror driving circuit included in the optical scanning apparatus, according to a potential difference between the first driving signal and the second driving signal.

11. The method of controlling the optical scanning apparatus as claimed in claim 10, wherein the setting the offset value sets the offset value to a value, that is larger than an upper limit value of a dead zone on a ground potential side of the amplifier, and matches a phase of the integral non-linearity error superimposed on the first driving signal and a phase of the integral non-linearity error superimposed on the second driving signal.

12. The method of controlling the optical scanning apparatus as claimed in claim 11, wherein the first driving signal and the second driving signal are sawtooth waves, and the driving causes a non-resonant oscillation of the mirror.

13. The method of controlling the optical scanning apparatus as claimed in claim 12, further comprising:

detecting, by a deflection angle sensor included in the optical canning apparatus, a position of the mirror along the one direction; and setting, by the system controller, a gain corresponding to amplitudes of the first driving signal and the second driving signal, based on a detection value of the deflection angle sensor.

14. The method of controlling the optical scanning apparatus as claimed in claim 13, wherein the setting the offset value sets the offset value to a minimum value of D satisfying a formula $D=(n \times M+M/2-G)/2$ and a relationship $D>Dth$, where n denotes a positive integer, M denotes a period of a change of the integral non-linearity error, G denotes a gain of the driving waveform data, and Dth denotes an upper limit value of the dead zone on the ground potential side of the amplifier.

\* \* \* \* \*